United States Patent
Niesner et al.

(10) Patent No.: US 9,827,932 B2
(45) Date of Patent: Nov. 28, 2017

(54) BUMPER WITH AN EMBOSSMENT

(71) Applicant: Volkswagen Aktiengesellschaft, Wolfsburg (DE)

(72) Inventors: Reinhold Niesner, Braunschweig (DE); Gerald Kuehn, Braunschweig (DE); Artur Denich, Ruehen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 22 days.

(21) Appl. No.: 15/214,939

(22) Filed: Jul. 20, 2016

(65) Prior Publication Data

US 2017/0021787 A1    Jan. 26, 2017

(30) Foreign Application Priority Data

Jul. 20, 2015   (DE) .................. 10 2015 213 605

(51) Int. Cl.
| | |
|---|---|
| *B60R 19/02* | (2006.01) |
| *B60R 3/00* | (2006.01) |
| *B60R 19/48* | (2006.01) |

(52) U.S. Cl.
CPC ............ *B60R 19/023* (2013.01); *B60R 3/00* (2013.01); *B60R 19/02* (2013.01); *B60R 19/48* (2013.01); *B60R 2019/486* (2013.01)

(58) Field of Classification Search
CPC ............................. B62D 35/005; B62D 35/02
USPC ....................................... 293/117; 296/180.1
See application file for complete search history.

(56) References Cited

U.S. PATENT DOCUMENTS

| | | | |
|---|---|---|---|
| 7,086,692 B2 | 8/2006 | Sebastian | |
| 7,380,869 B2 | 6/2008 | Nakaya | |
| 7,416,232 B2 | 8/2008 | Tier et al. | |
| 8,132,850 B2 * | 3/2012 | Dannhaeuser | B60Q 1/0005 |
| | | | 296/181.5 |
| 9,199,674 B2 * | 12/2015 | Wolf | B60K 11/08 |
| 2007/0182207 A1 * | 8/2007 | Nakaya | B62D 25/182 |
| | | | 296/180.1 |
| 2017/0082092 A1 * | 3/2017 | Gaither | F03D 9/32 |

FOREIGN PATENT DOCUMENTS

| | | | | |
|---|---|---|---|---|
| DE | 31 18 788 A1 | 4/1982 | | |
| DE | 94 16 113 U1 | 12/1994 | | |
| DE | 103 56 238 A1 | 7/2005 | | |
| DE | 10 2004 026 464 A1 | 9/2005 | | |
| DE | 10 2004 035 326 A1 | 9/2005 | | |
| DE | 10 2007 002 331 A1 | 10/2007 | | |
| EP | 0 899 165 A2 | 3/1999 | | |
| FR | 2 858 796 A1 | 2/2005 | | |
| FR | 2 920 701 A1 | 3/2009 | | |
| GB | 1 295 126 | 11/1972 | | |
| JP | 2013071462 A | * | 4/2013 | ............ B62D 25/16 |
| WO | WO 2011/142694 A1 | 11/2011 | | |

* cited by examiner

*Primary Examiner* — Pinel E Romain
(74) *Attorney, Agent, or Firm* — Muncy, Geissler, Olds & Lowe, P.C.

(57) ABSTRACT

A bumper having at least one embossment being formed extending counter to the vehicle traveling direction and the embossment having a base surface, a rear face, an internal inner face, and an external inner face. The base surface is formed as a step and the rear face has at least one first vent hole. The first vent hole is connected to a vent passage and the vent passage comprises a vent passage longitudinal axis that forms an acute angle with the vehicle traveling direction.

12 Claims, 3 Drawing Sheets

BUMPER WITH AN EMBOSSMENT

This nonprovisional application claims priority under 35 U.S.C. §119(a) to German Patent Application No. 10 2015 213 605.1, which was filed in Germany on Jul. 20, 2015, and which is herein incorporated by reference.

BACKGROUND OF THE INVENTION

Field of the Invention

The invention relates to a bumper with an embossment for people to stand on.

Description of the Background Art

For reaching vehicle windows of tall vehicles and vehicle roofs, people are presented with a variety of aids.

Known aids are attachable steps. These are hooked on hooks behind a free end of a bumper, see DE 94 16 113 U. If a person steps on such a step, said person can reach the vehicle roof, superstructures or roof luggage more comfortably. In addition, accessibility of the windshield, for example, for scraping ice in winter, is substantially improved.

Movable steps for installation in or under vehicles have been widely known for some time. They feature two positions. In a driving position, the moveable step is retracted underneath the vehicle under the vehicle contour or in a pocket in the vehicle contour. In a position of use, however, the step is partially deployed from under the vehicle contour to the outside, or from the pocket in the vehicle contour to the outside, so that a person can step on it.

Moveable accessible steps are also known, for example, from DE 10 2004 035 326 A1. The publication discloses arranging an entry area with steps beneath a truck door. In this entry area, in each case a cooling air feeding device is provided that can be unfolded from a retracted stationary vehicle position into a deployed vehicle driving position. Depending on whether the truck is stationary or traveling, the space present in the entry area between the steps is available as a cooling air channel while driving. When the vehicle is stationary, however, the cooling air feeding device is retracted again, so that the existing space between the steps can be used for boarding.

An integration of steps in the bumper is also known. For an integration of the steps, bumpers feature embossments in the bumper. Step plates are bolted to the base of the embossment as steps. Vehicles having bumpers with an integrated step are now available from camping and caravan dealers.

FR 2 858 796 A1 discloses a discharge of built up air in front of a bumper. It also discloses introducing a barred passage in the front of the bumper. The passage discharges the air mass into the wheel housing shell of the motor vehicle in two different currents.

SUMMARY OF THE INVENTION

It is therefore an object of the invention to reduce aerodynamic drag of bumpers.

In an exemplary embodiment, a bumper is provided having a first vent hole connected to a vent passage and the vent passage comprises a vent passage longitudinal axis that forms an acute angle with the vehicle traveling direction.

The advantage is that by this measure, the drag of the bumper is reduced. Compared to a simple removal of built up air masses, the vent passage has the advantage of dissipating the air masses in a certain direction. These are obliquely conducted out of the wheel housing. Thus, the $C_w$-value of the vehicle with the vent passage as compared to the $C_w$-value of a vehicle without a vent passage is reduced, that is, improved.

Flow separations significantly increase drag. A further advantage of the vent passage is that it counteracts flow separations at the embossment.

For purposes of the present description, the usual direction of travel of a motor vehicle is designated with "−x" ("minus x"), the direction counter to its normal direction of travel with a "+x" ("plus x"), the direction in the horizontal starting from the usual driving direction (−x) and transverse to the x-direction viewed to the right is designated with "+y", the direction in the horizontal starting from the usual driving direction (−x) and transverse to the x-direction viewed to the left with "−y", the direction in the vertical transverse to the x-direction viewed upwards with "+z", and the direction in the vertical transverse to the x-direction viewed downwards with "−z". This terminology of the spatial directions in Cartesian coordinates corresponds to the coordinate system commonly used in the automotive industry. Moreover, terms such as "front", "rear", "above", "below" and words of similar concepts, including the terms "right" and "left", are used in such a manner as they are commonly used for direction designation in a motor vehicle.

In an embodiment of the invention, the vent hole is a vent passage that extends counter to the vehicle traveling direction. Because the vent passage extends counter to the vehicle traveling direction, the embossment space is completely usable as a step. This has the advantage that the steps for vehicles can more easily comply with the dimensional requirements of trade associations.

The tread surface of the step can be free of inlets for flow channels, so that the tread surface can be designed more easily according to the requirements of trade associations by choosing a suitable upper material.

In an embodiment, the vent passage can be shaped widened in cross-section. Nozzles can have widening cross-sections in the nozzle extension up to the nozzle orifice. They thus have the form of an inverted funnel. The advantage of a widening cross-section is to expand air masses passing through. If the vent passage is shaped widened in cross-section, it can expand the air that is bypassing the front tire to the side of the vehicle. This way, no air mass builds up in the wheel housing.

In an embodiment, the vent passage can be constructed as a separate component. The advantage of a vent passage as a separate component is its ease of manufacture. Because the vent passage is a separate component, its shape can be easily changed. This results in a certain modularity.

In an embodiment, the vent passage can have a C-shaped profile in cross-section which may be designed, for example, round or square. C-profiles have a recess on their circumference. Thus, C-profiles are open in their length in the direction of the recess. This opening has two edges in its longitudinal direction. The advantage of C-profiles is that they can be joined along their two edges to other surfaces. A vent passage having a C-profile can thus be connected at its two edges with the external inner face.

In an embodiment, the external inner face of the embossment can be configured to merge in a wall of the vent passage. An inventive bumper with vent passage can be easily produced in two parts. To this end, a bumper with an elongated outside edge and a vent passage with a C-profile may be joined together. The advantage of an embossment which merges in a wall of the vent passage is that this wall may be formed as a continuous outflow surface for the vent stream. There is no joint between the wall and the bumper which disturbs the discharge of the vent stream. Without a joint, the vent stream advantageously does not break off and also does not build up in the joint.

In an embodiment, the bumper can include sockets. Sockets serve to receive plug-in parts. Thus, they are part of a releasable connection. Usually plug-in parts and sockets are shape-coded. Only certain plug-in part shapes are consistent with the shape of the socket. Only then can the two parts connect. The plug-in parts are advantageously secured against falling out or removal from the socket. The advantage of sockets is that third parts such as a cover can be easily connected to the bumper. For this, the third parts should only be designed and plugged in as plug-in parts with suitable socket counterparts.

In an embodiment, the bumper can have a cover. Covers close cavities, so that they are protected against the infiltration of substances. The cover in the bumper prevents or reduces the penetration of wind in the embossment. Therefore, the wind cannot build up in the embossment. Closed embossments thus reduce drag. The advantage of the cover is to reduce the drag. It also protects against the ingress of water or snow. Objects, for example, branches, can get stuck in embossments. Another advantage of the cover is to increase protection against snagging.

In an embodiment, the cover can have at least one passage. The passage allows the airstream to flow through the cover into the embossment. By means of the shape and depth of the passage, the vent stream can be purposefully directed in the direction of the vent passage so that the vent stream is more readily dissipated. The advantage of a passage in the cover is that an intended flow of inlet air can purposefully be obtained in the embossment, the amount of which will generally be less than in the absence of the cover.

In an embodiment, the cover may be releasably and/or movably attached or attachable with the bumper, and in particular, with the base surface, the internal inner face or the external inner face of the embossment of the bumper. For example, it may be hinged with a pivot axis at the internal inner face, or it may be releasably attached to the external inner face by means of a snap or plug connection. If the embossment is to be used as a step when the vehicle is stationary, a cover thus configured can then be advantageously removed or swiveled away, freeing the base for use as a step, whereas when the vehicle is driven, the cover is once again advantageously plugged or swiveled in front of the embossment in order to achieve the previously mentioned advantages of a cover in front of the embossment.

The various embodiments of the invention mentioned in this application can be, unless stated otherwise in the individual case, advantageously combined with one another.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
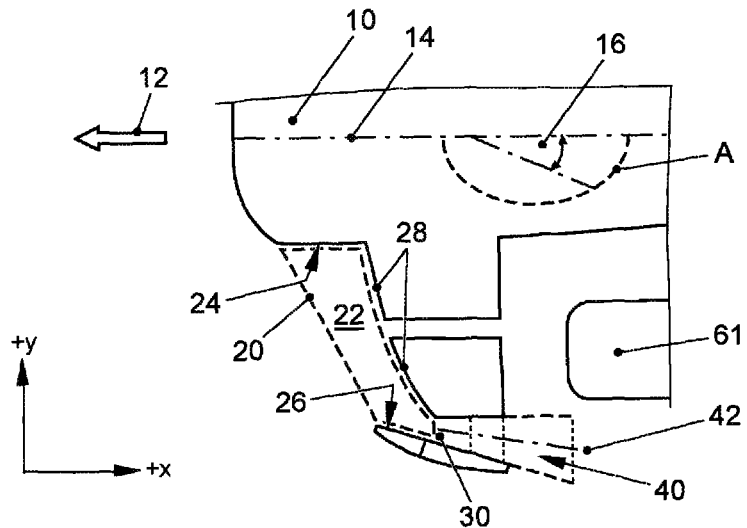
FIG. 1 is a bumper in a plan view.

FIG. 1 shows the vehicle left outer side of a bumper 10 in a plan view. The bumper 10 extends transversely to the vehicle longitudinal axis 14; it caps off a vehicle towards the front in its direction of travel 12 (in the direction −x).

The bumper 10 has embossments 20 at its two outer sides (in FIG. 1, only the vehicle-left outer side is shown). Steps in a surface are called embossments 20. The step thereby has a certain shape. The embossment 20 is a step in the bumper 10.

The embossment 20 corresponds to an indentation that is arched into the bumper 10, counter to the vehicle travel direction 12 (i.e. in the direction +x). Looking into the embossment 20, i.e. in the direction +x, which in the drawing plane of FIG. 1 is from left to right, the embossment 20 includes an internal inner face 24 at its left side. Straight ahead (in the direction of +x), the viewer looks at the rear face 28 of the embossment 20. On the right, the embossment 20 has an external inner face 26.

The embossment 20, i.e. the step, has a base surface 22. The base surface 22 of the embossment 20 is located in the x-y plane between the internal inner face 24 and the external inner face 26. That is the drawing plane of FIG. 1.

In the present embodiment, the base surface 22 is the step surface of a step. A person (not shown) can step on it with a foot or both feet.

Alternatively, the embossment 20 can be divided into further steps.

In the present embodiment, the rear face 28 of the embossment 20 is provided with a vent hole 30. This vent hole 30 is a passage that allows air flow to pass along the external inner face 26 through the rear face 28 during forward travel of the vehicle. The size of the vent hole 30 can be configured in different ways, from being a small hole to covering the entire rear face 28.

In a further embodiment, the vent hole 30 may also have a plurality of smaller vent holes 30.

Figure 3:
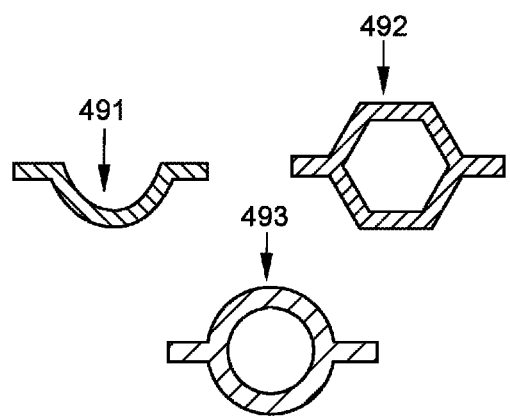
FIG. 3 show profiles of vent passages (in cross-section)

In another embodiment, the vent holes 30 form holes or slots or passageways of different cross-sections (see FIG. 3).

A vent passage 40 adjoins the vent hole 30 downstream.

In the preferred embodiment, the vent passage 40 is conical. It has a vent passage axis 42 which passes through it centrally. The course of the vent passage axis 42 is shown in detail A. It can be seen that the vehicle longitudinal axis 14 and the vent passage axis 42 are at an acute angle 16 to one another. An acute angle denotes an angle between 0 and 90 degrees between the vehicle longitudinal axis 14 and the vent passage axis 42 (counter to the vehicle traveling direction 12). The 0-degree position is enclosed just like the 90-degree position of the two to one another. FIG. 1 shows that vent stream 60 is conducted past the left front tire 61 by the arrangement and position of the vent passage 40 at a certain acute angle 16. Thus, the vent stream 60 is not jammed, resulting in a reduction of the $C_w$-value of the vehicle. The $C_w$-value is a variable for specifying the drag of a vehicle. The drag of a vehicle is calculated from the product of dynamic pressure, $C_w$-value and end face of the vehicle: $F=q \cdot c_w \cdot A$. The lower the $C_w$-value, the less its drag. Allowing said vent stream 60 to pass through, discharges air and thus reduces the drag of the vehicle.

The angle of attack of the vent passage 40 has a large impact on the aerodynamics of the vehicle (not shown). Because the flow on the outside of the bumper breaks off as a function of the angle of attack. Therefore, the angle is advantageously chosen such, that the flow breaks off late or ideally only at the trailing edge of the bumper and the vent passage.

Figure 2:
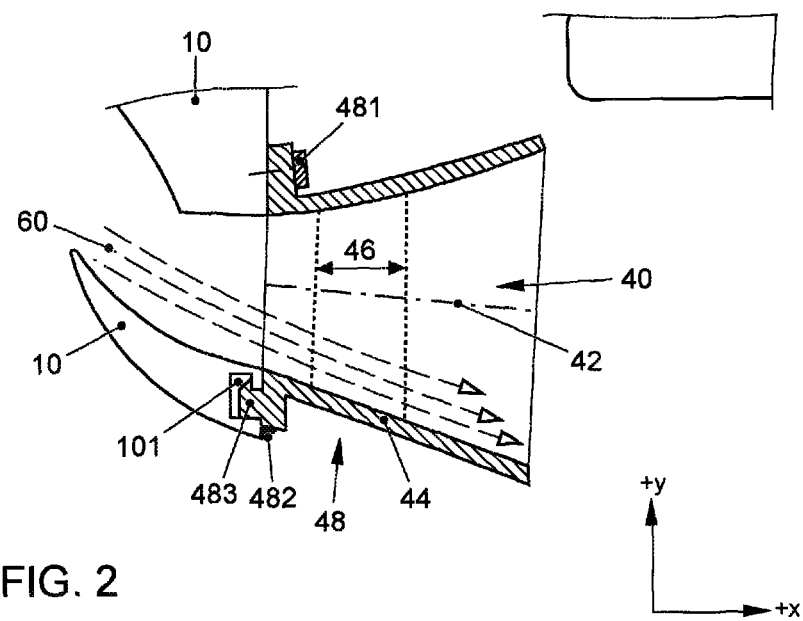
FIG. 2 is an inventive vent passage in an enlargement.

FIG. 2 shows a vent passage 40 according to the invention in an enlarged representation.

Shown is a bumper 10 to which a vent passage 40 is mounted as a separate component 48. In a preferred embodiment, the vent passage 40 is clipped as a separate component 48 by means of a hook 483 in a socket 101 of the bumper 10.

In alternate embodiments, the vent passage 40 is fixed on one side with the bumper 10 with a screw fitting 481, on its other side, with a weld 482.

The vent passage 40 has a peripheral wall 44. It is strong enough to not be deformed by the vent stream 60. Therefore, it has a few millimeters of plastic. However, also other materials such as steel, aluminum, magnesium or fiber composites withstand deformation with suitable dimensioning.

The cross-section 46 of the vent passage 40 widens counter to the vehicle traveling direction 12, i.e. in the direction +x in the direction of the left front tire 61 and toward the end of the vehicle (not shown). The vent stream 60 is expanded through this funnel opening so that it does not generate any increased drag on the rear face of the front wheel housing (not shown).

FIG. 3 shows various cross-sectional profiles of vent passages 40.

In a preferred embodiment, the profile of a vent passage 40 is C-shaped in cross-section, i.e. formed as a C-profile 491. This means that it is open on one side. The vent passage 40 in the C-profile 491 is mounted with its open side on an elongated outer bumper side so that it closes off the open side of the C-profile 491 toward a vent passage 40 (not shown).

In alternative embodiments, the profile of the vent passage 40 is a polygonal profile 492 or a round profile 493.

Figure 4:
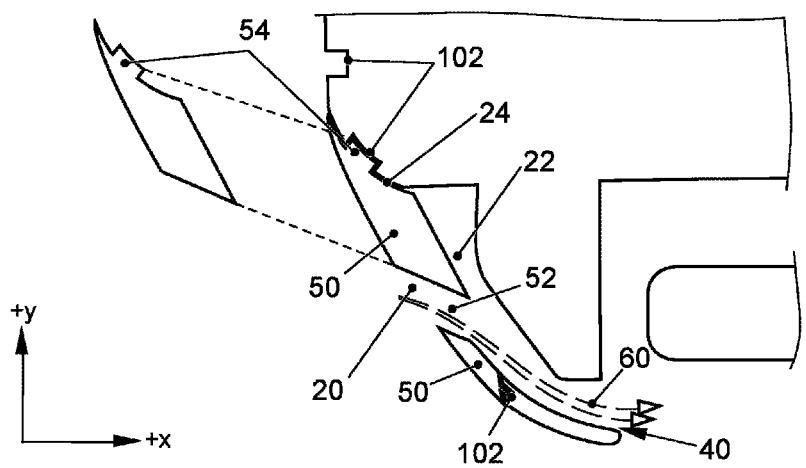
FIG. 4 is a bumper with a cover in a plan view.

FIG. 4 shows a bumper 10 with a cover 50 in a plan view. The cover 50 is clipped in plug sockets 102 with cover hooks 54 and can in this way be attached releasably and without tools to the internal inner face 24 of the embossment 20.

A passage 52 is embedded in the cover 50. The passage 52 guides the vent stream 60 directly into the vent passage 40.

The cover 50 closes the embossment 20 so that the drag is decreased. Due to the lid 50, the angle of attack for the incoming air is optimized. The cover 50 is made of the same material as the bumper 10.

If the cover 50 is attached on the bumper 10 by means of the clip connection 54, 102, it largely blocks access to the base surface 22 of the embossment 20 so that it cannot be used as a step. During travel, the already described aerodynamic advantages result. When the vehicle is stationary, the cover 50 can easily be temporarily removed by loosening the clip connection 54, 102, so that the base surface 22 of the embossment 20 can be used as a step surface. After this use, the cover 50 can again be mounted in front of the embossment 20 in the bumper 10.

Figure 5:
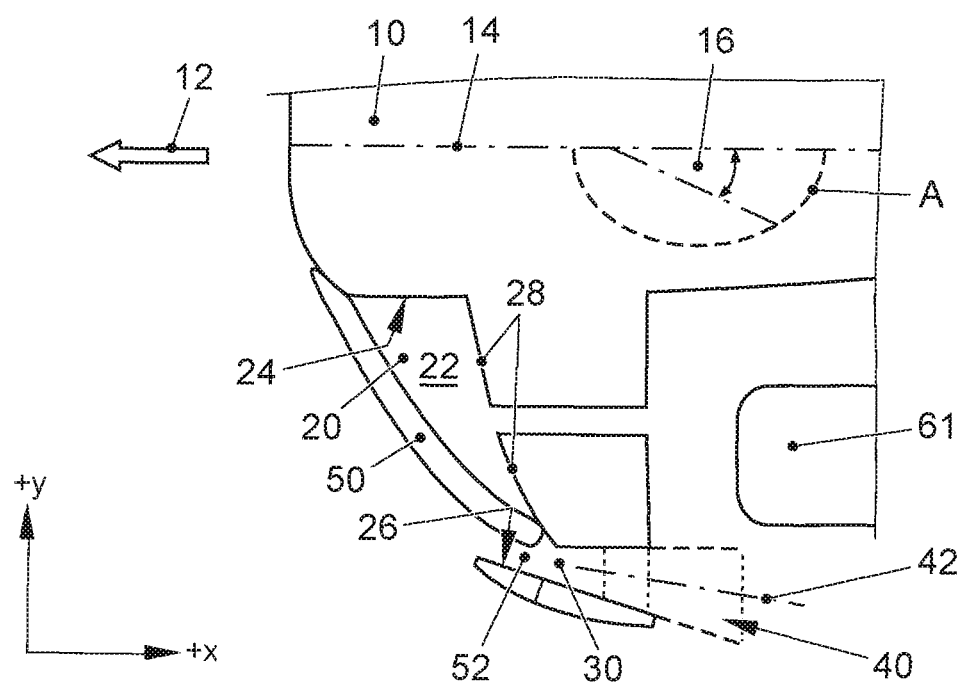
FIG. 5 is another embodiment of a bumper.

Finally, FIG. 5 shows an embodiment in which the cover 50 forms the passage 52 with the external inner face 26.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bumper comprising:
   at least one embossment, the embossment being formed extending counter to the vehicle traveling direction and the embossment comprising a base surface, a rear face, an internal inner face, and an external inner face, wherein the base surface is constructed as a step; and
   at least one first vent hole formed in the rear face, the first vent hole being connected to a vent passage, the vent passage having a vent passage longitudinal axis that forms an acute angle with a vehicle traveling direction.

2. The bumper according to claim 1, wherein the vent hole is a vent passage extending counter to the vehicle traveling direction.

3. The bumper according to claim 1, wherein the vent passage is shaped widened in cross-section.

4. The bumper according to claim 1, wherein the vent passage is constructed as a separate component.

5. The bumper according to claim 1, wherein the vent passage has a C-profile.

6. The bumper according to claim 1, wherein the external inner face of the embossment is configured to merge in a wall of the vent passage.

7. The bumper according to claim 1, wherein the bumper has plug sockets.

8. The bumper according to claim 1, wherein the bumper has at least one cover.

9. The bumper according to claim 8, wherein the cover has at least one passage.

10. The bumper according to claim 9, wherein the passage facilitates vent stream to pass into the vent passage.

11. The bumper according to claim 8, wherein the cover is detachably and/or movably connected or is connectable to the bumper.

12. The bumper according to claim 1, wherein the cover is detachably and/or movably connected or is connectable to the base surface, the rear face, the internal inner face or the external inner face of the embossment.

* * * * *